Fig. 2.

W. A. HILL.
PILL COUNTER AND BOTTLE FILLING MACHINE.
APPLICATION FILED JUNE 3, 1921.

1,422,860. Patented July 18, 1922.
11 SHEETS—SHEET 4.

Inventor
Wilford A. Hill
by
Attorneys

W. A. HILL.
PILL COUNTER AND BOTTLE FILLING MACHINE.
APPLICATION FILED JUNE 3, 1921.

1,422,860.

Patented July 18, 1922.
11 SHEETS—SHEET 6.

Fig. 6.

Inventor
Wilford A. Hill
by Attorneys

Inventor
Wilford A. Hill
by Attorneys

UNITED STATES PATENT OFFICE.

WILFORD A. HILL, OF WALTHAM, MASSACHUSETTS, ASSIGNOR TO B. O. & G. C. WILSON INC., OF BOSTON, MASSACHUSETTS, A CORPORATION OF MASSACHUSETTS.

PILL-COUNTER AND BOTTLE-FILLING MACHINE.

1,422,860.  Specification of Letters Patent.  Patented July 18, 1922.

Application filed June 3, 1921. Serial No. 474,819.

*To all whom it may concern:*

Be it known that I, WILFORD A. HILL, a citizen of the United States, residing at Waltham, in the county of Middlesex and State of Massachusetts, have invented new and useful Improvements in Pill-Counter and Bottle-Filling Machines, of which the following is a specification.

This invention relates to machines for filling receptacles with measured quantities of material, having been designed more particularly to fill a plurality of bottles simultaneously with a measured number of pills, tablets or the like.

This invention provides a mechanism by which each bottle or container in a row receives the exact number of pills or tablets desired and when all the bottles of the row are filled they are moved out of the way automatically and a row of empty bottles moved into filling position.

This invention further provides a mechanism which will not feed the bottles out of filling position until all the bottles are properly filled, but which stops the filling of each bottle as soon as it has received the proper number of pills.

This invention further provides a positive mechanism for counting the pills so that all uncertainty as to the number fed is eliminated.

A mechanism for feeding the pills from the reservoir into proper relation to the filling mechanism is also a part of this invention.

For a more complete understanding of the invention, together with further objects, advantageous details and combinations of parts, reference may be had to the accompanying drawings illustrating an embodiment thereof, in which—

Referring more particularly to Figures 1, 2, 3, and 9, at 1 is indicated a table or support for carrying a series of rows of containers such as bottles, shown at 2. These bottles are positioned in a removable tray held in a rack 3 adjustably mounted in end frames 4 of the table 1 and clamped in position therein by means of the nuts 5. By this means the tray may be adjusted to conform to bottles of varying shapes and sizes. In order to conform to bottles of varying widths, spacers may be interposed between them, if desired, or the filling mechanisms may be variously spaced across the machine. The table 1 is movable on a track 6 carried by the base A of the machine and between a pair of upright side frames 7 carried thereby. These uprights serve to position the filling mechanisms, which are designed to operate simultaneously on each bottle of a transverse row, in the machine herein shown there being sixteen bottles in each row.

The side frames 7 are joined above the tops of the bottles by means of a plate 8 which furnishes a floor for supporting certain parts of the mechanism. As shown more particularly in Figures 5, 6, 7 and 8, above the floor 8 are positioned a pair of shafts 9 and 10 extending between the side frames 7, shaft 9 having its lower half seated in the side frames 7 and being re tained therein by means of a block 11 fixed to the upper face of each side frame. Spaced along the shafts 9 and 10 are various parts of the filling mechanism.

Figure 13:
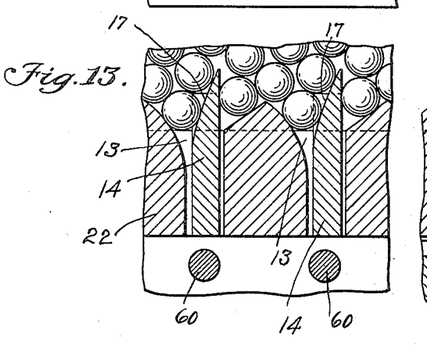
Figure 13 is a section on line 13—13 of Figure 6.
Figure 14:
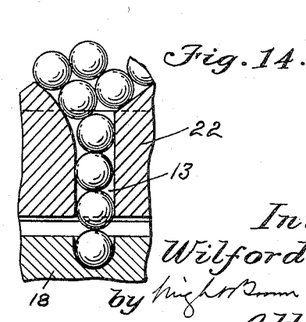
Figure 14 is a detailed section of the same parts in different positions.

Extending across the machine between the side frames is carried a hopper 12 for containing the pills or tablets to be fed into the bottles. The lower end of this hopper terminates in a series of downwardly extending passages, as shown in Figures 13 and 14 at 13, of sufficient width to contain a single layer of pills or tablets, there being one such passage for each bottle to be filled, and each passage being positioned directly above a bottle. Each passage 13 is open at its forward side to form a slot for the passage therethrough of an agitating and separating plate 14, this plate being formed on an arm 15 fixed to a shaft 16 journaled in the frame portions 7. This plate 14 substantially closes the opening in the slot 13 and its inner end is beveled off on one side, as shown at 17 in Figure 13. On the rocking of the shaft 16 to project the plate within the slot 13, this beveled edge rides upwardly, forcing the pills out of the slot 13 and dividing the pills in the lower end of the hopper 12 as shown in Figure 13. On retraction of the plate 14 the beveled edge allows the pills to move downwardly toward the upper end of the slot 13 on that side of the plate 14, and prevents such action on the non-beveled side. This effectually prevents jamming of the pills at the entrance to the slot 13 so that when the plate 14 is fully retracted, the slot 13 is filled with pills, as shown in Figure 14.

Figure 6:
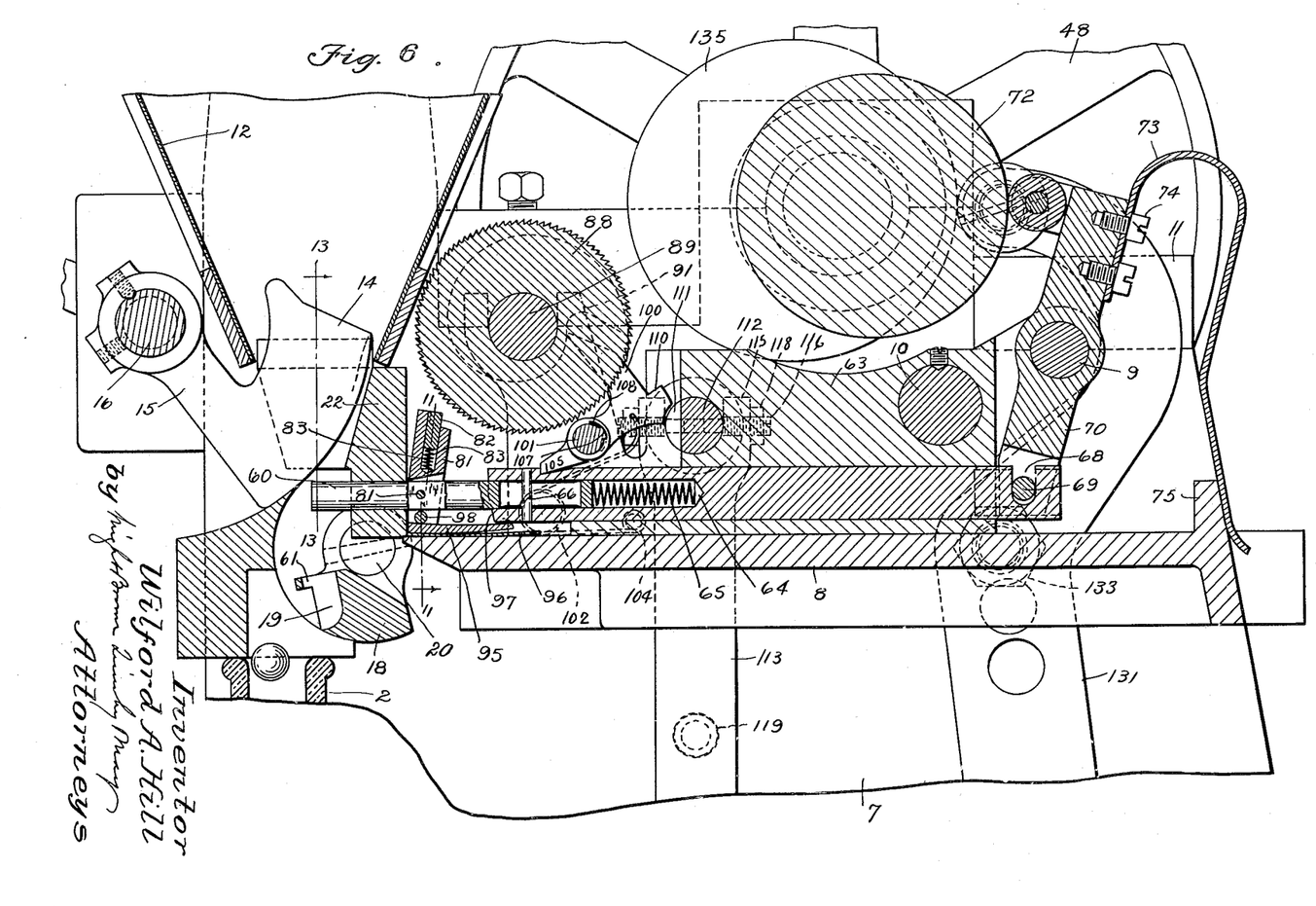
Figure 6 is a similar section showing a different position of the parts.

Beneath the slot 13 is positioned a dumping receptacle 18 having its upper surface hollowed out at 19 to form a space sufficiently large to hold a single pill or tablet. It is intended that a series of such receptacles shall be employed of different sizes and shapes to conform to the sizes and shapes of the pills or other articles handled by the machine. These dumping receptacles are spaced along a rock shaft 20 journaled in the side frames 7 and the outer face of each is formed on an arc struck about the center of the shaft 20 to ride within a correspondingly shaped recess forming a stationary chamber in an end frame member 21. The top of this member 21 is also cut away in an arc about the axis of the shaft 16 as a center and has close engagement with the lower arc shaped faces of the plates 14. The inner edge of the slots 13 are closed off by a transverse plate 22 extending between the side frame members 7. At each cycle of operation of the machine, each separator plate 14 is projected upwardly within the hopper, as above described, and then retracted, allowing a single pill to position itself in each of the dumping receptacles 19. On the subsequent inward movement of the plate 14, which cuts off the receptacle 18 from the supply of pills, this receptacle is rocked by turning the shaft 20, allowing the pill contained therein to fall downwardly into the neck of the bottle, as shown in Figure 6. The plate 14 is normally held retracted by a coil spring 23 engaging at one end with a pin 24 fixed to an arm 25 forming part of the member 15, this spring having its outer end hooked over a pin 26 made fast to one of the frame members 7.

Figure 1:
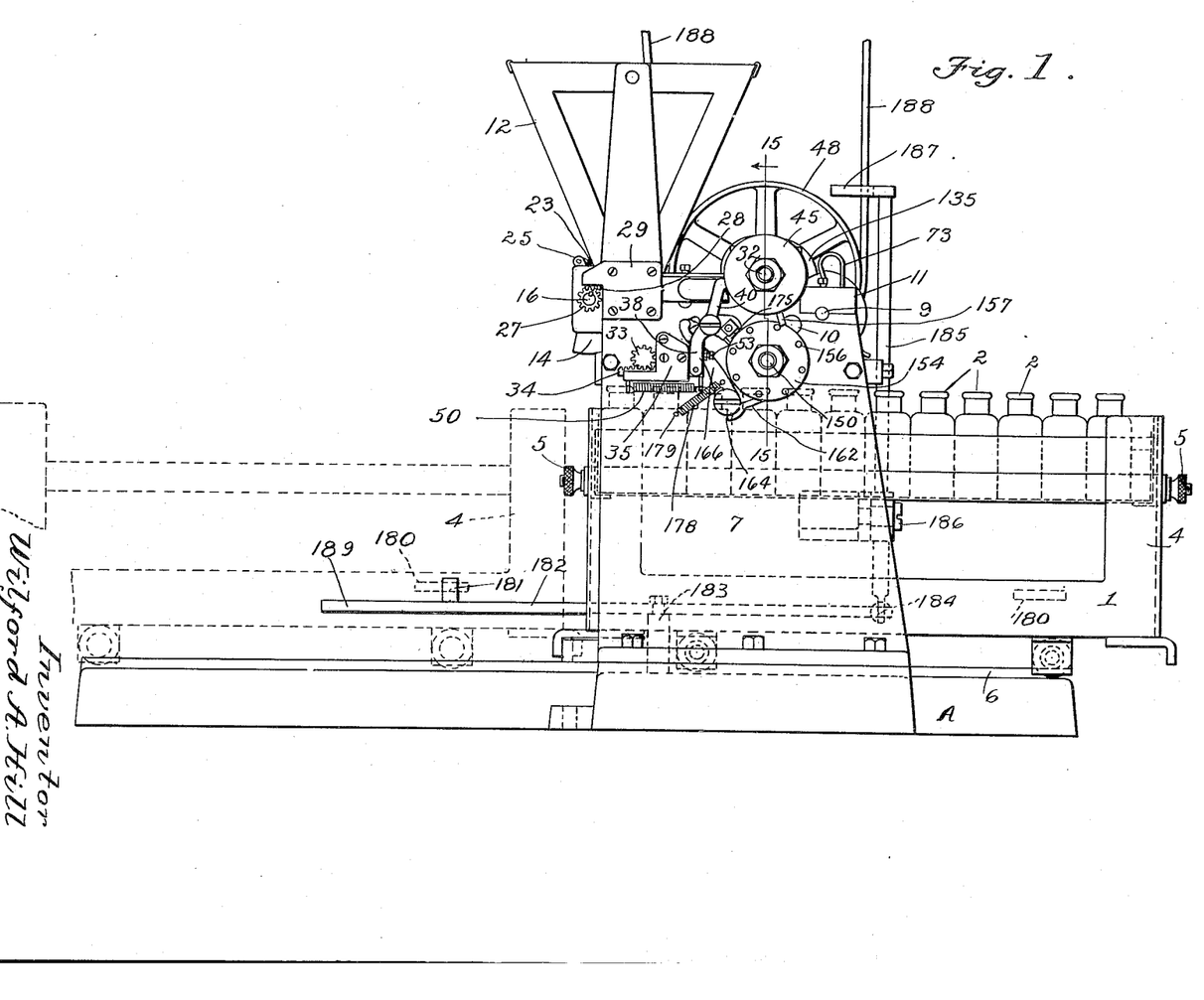
Figure 1 is a right side elevation of the machine.
Figure 2:
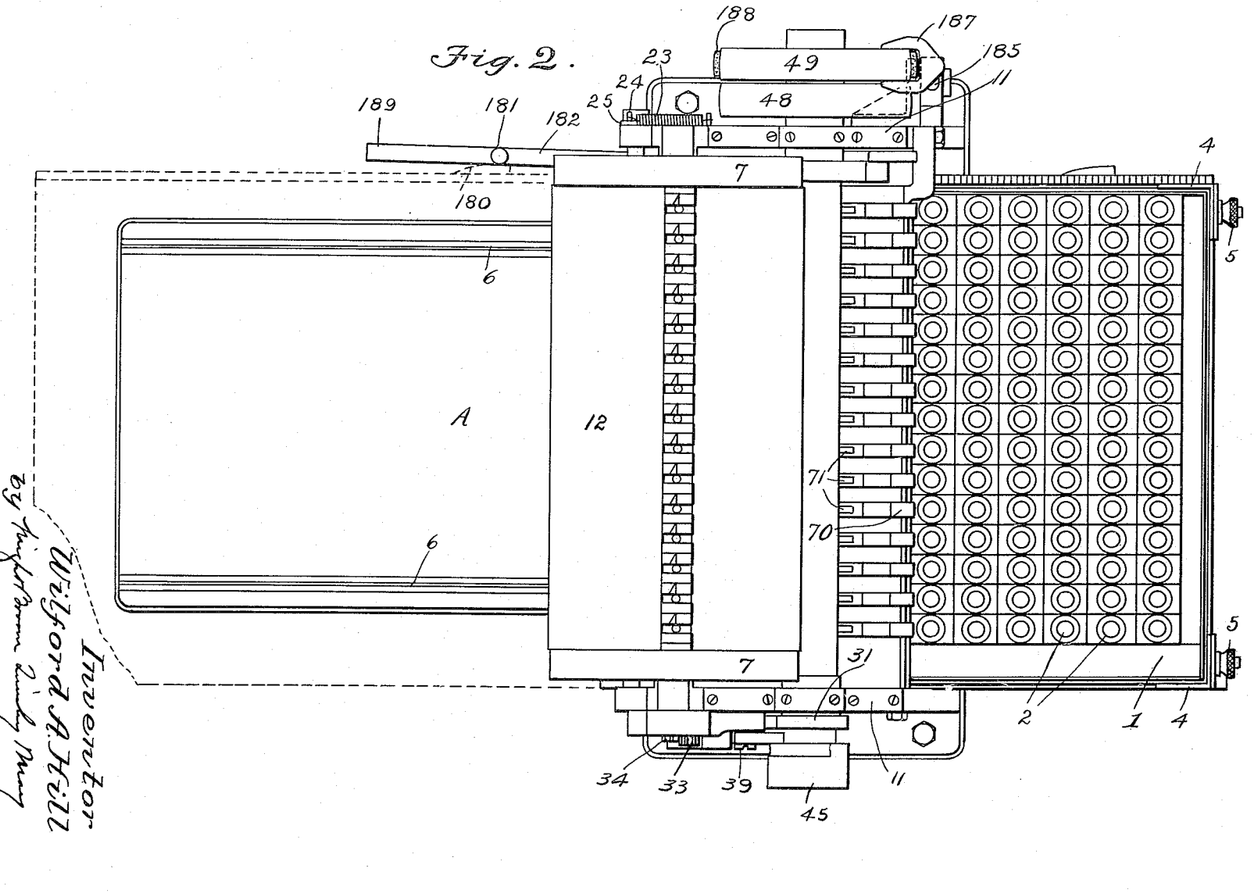
Figure 2 is a top plan view.
Figure 3:
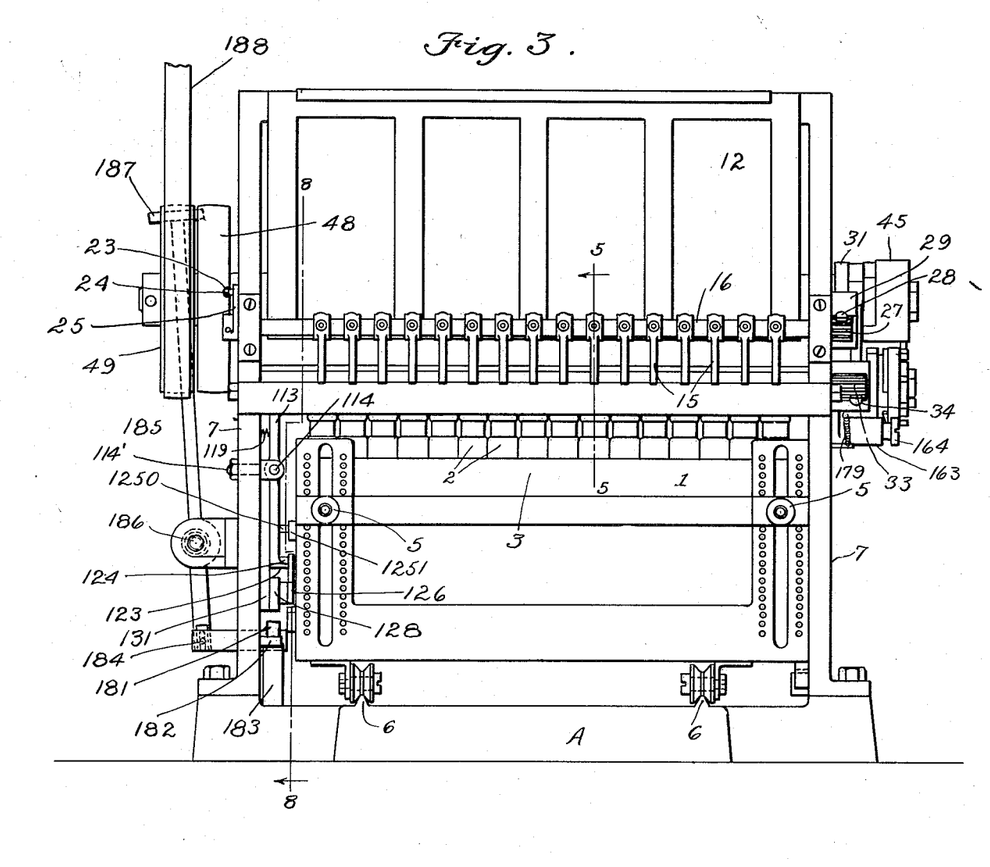
Figure 3 is a rear end elevation.
Figure 4:
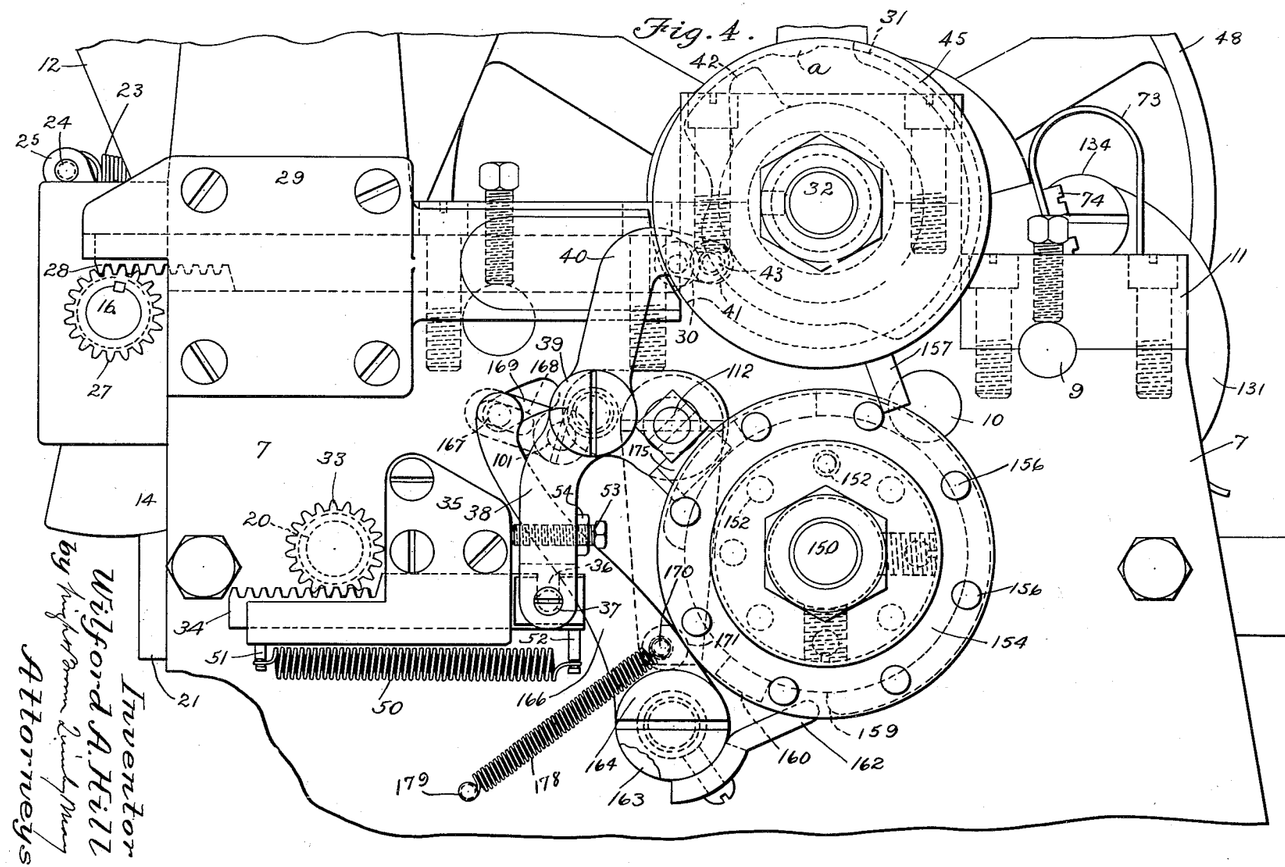
Figure 4 is a fragmentary side elevation on a larger scale than Figure 1.

The shaft 16 is rocked to project the plates 14 within the slots 13 by means of the following mechanism. One end of the shaft 16 has fixed thereto a gear 27, as shown in Figure 4, and meshing with this gear is a rack bar 28 which projects beneath a suitable guide plate 29 fixed to one of the side frames 7 and carries on its rear end a roller 30 cooperating with an edge cam 31 fixed to a main power shaft 32. This edge cam has a short depression at $a$ which gives an agitating movement to plate 14 when it is projected within the hopper.

The row of dumping receptacles is also actuated by rocking the shaft 20, this shaft having fixed thereon at one end a gear 33 meshing with a rack bar 34 carried by a plate 35 fixed to the side frame member 7. This rack bar 34 has at its rear end a slot 36 within which engages a pin 37 carried by a lever 38 fulcrumed at 39 and having an upwardly extending arm 40 which carries a cam roll 41 in cooperative relation to an edge cam 42. Projecting laterally adjacent the roll 41 is a pin 43 which projects beneath an arcuate flange 44 carried by a disc 45 fixed to the end of the shaft 32. Beyond the other side frame member 7 this shaft has fixed thereto a tight pulley 48 and adjacent thereto has journaled thereon a loose pulley 49. The rack bar 34 is normally held in its outward position with the dumping receptacles in position to receive a load, by means of a spring 50 engaging at one end a pin 51 fixed to the plate 35, and at its other end a similar pin 52 fixed to the rack bar. To adjustably determine the limit of motion of the shaft 20 in one direction to bring the receptacles into proper relation to the hopper, an adjusting screw 53 carrying a check nut 54 is threaded through the arm 38 and bears at its inner end against the edge of the plate 35.

In order that the proper number of pills may be fed into each container, a counting mechanism has been provided for each dumping receptacle. This mechanism comprises a feeler bar 60 slidable through a perforation in the bar 22 and passing through a channel 61 in the dumping receptacle where it may impinge on the contents thereof. This bar is projected inwardly into contact with the pill or other object periodically by means of a bar 62 slidably mounted in a guide block 63, there being one guide block for each bottle and a series of guide blocks being spaced along the shaft 10. The rear end of the feeler bar 60 telescopes within a perforation 64 within the bar 62 and is normally held outwardly therefrom by means of a spring 65 reacting between the base of the perforation 64 and the end of the bar 60. The limit of outward motion of the bar 60 relative to the bar 62 is determined by means of a pin 66 passing through a slot 67 in the bar 60 and seated at opposite ends in the bar 62. This bar 62 has a slot at its rear end at 68 for the reception of a pin 69 carried in the forked extremity of a lever 70 fulcrumed on the shaft 9 and carrying at its upper end a cam roll 71 which bears against a cylindrical cam 72 fixed to the shaft 32 between the frame portions 7. The cam roll 71 is resiliently urged against the face of this cam 72 by means of a leaf spring 73 fixed by screws 74 to the lever 70 and reacting at its outer end against the outer face of an upwardly projecting flange 75 forming part of the transverse frame member 8.

Figure 5:
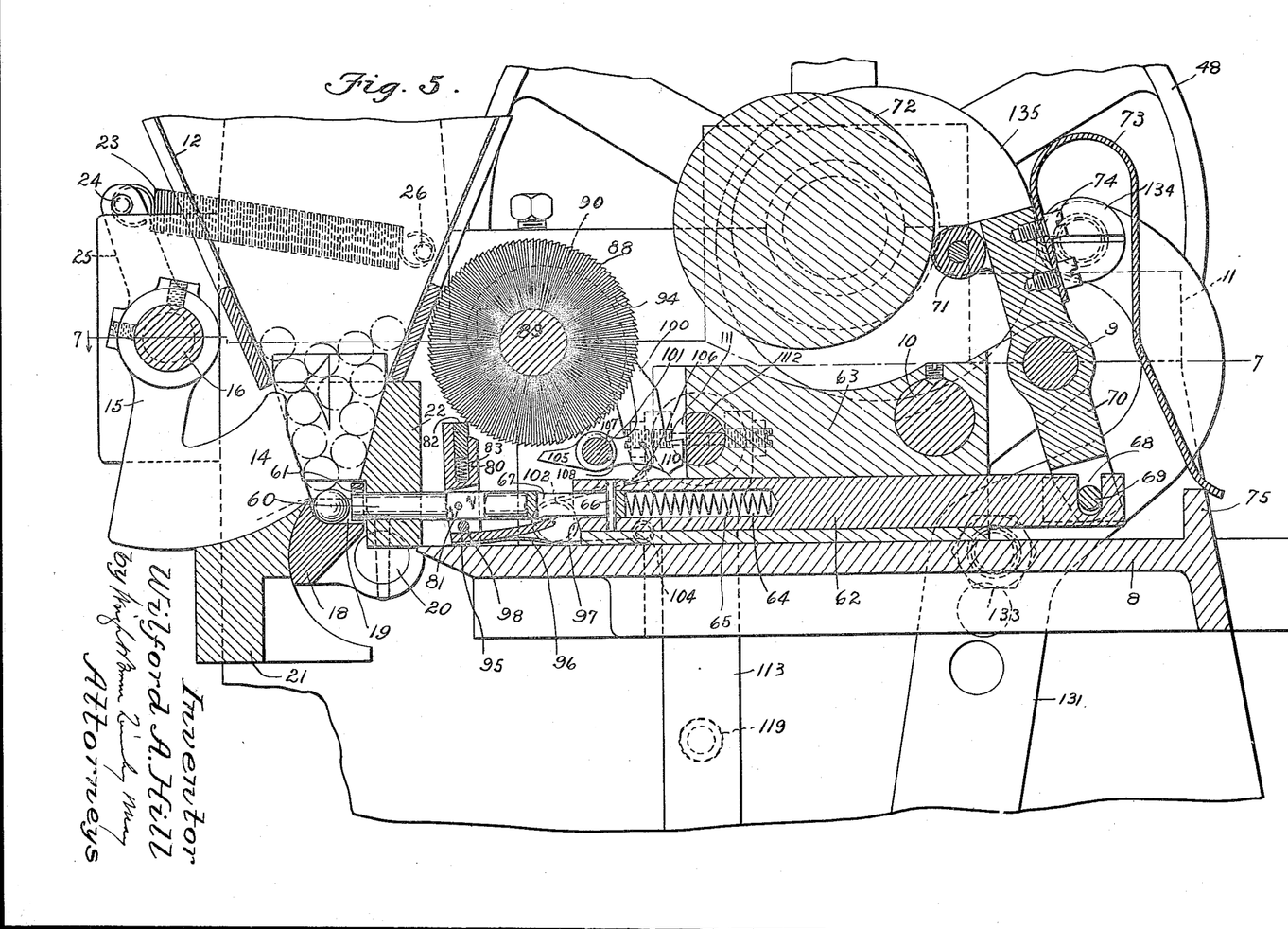
Figure 5 is a fragmentary longitudinal vertical cross section on line 5—5 of Figure 3.
Figure 10:
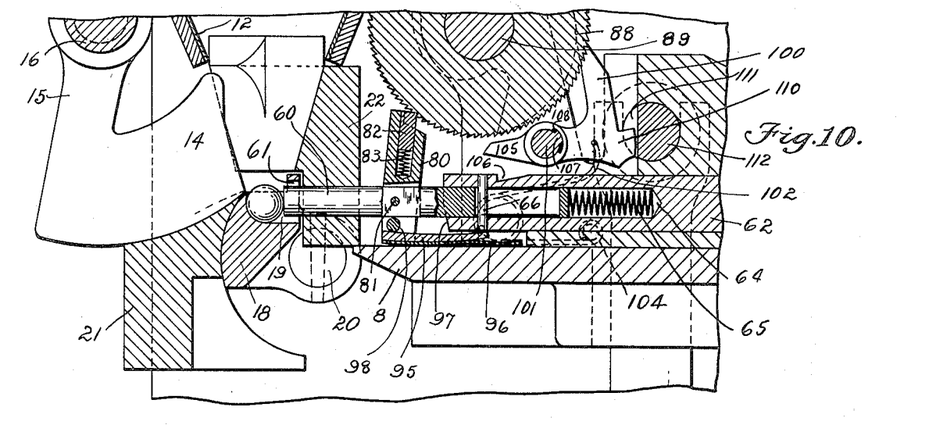
Figure 10 is a fragmentary section of the counting mechanism shown in Figures 5 and 6 in different positions.
Figure 11:
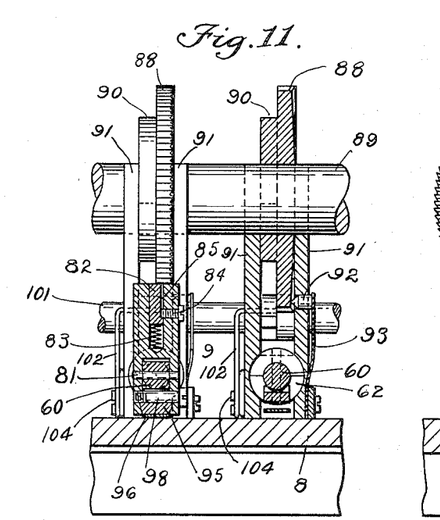
Figure 11 is a fragmentary section on line 11—11 of Figure 6.
Figure 12:
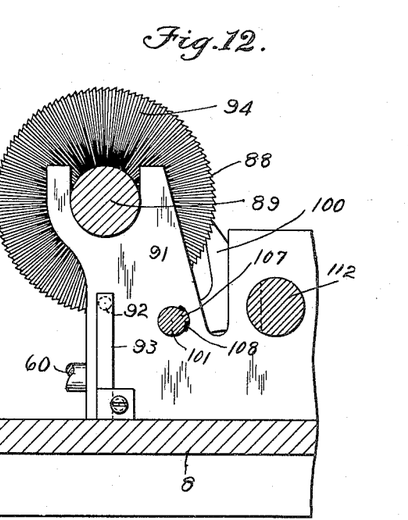
Figure 12 is an end view of the parts shown in Figure 11.

These parts are so timed that after the retraction of the separator plate 14, allowing a pill to descend into the dumping receptacle therebeneath, the bar 60 is projected into the receptacle and into contact with the pill. When such contact is made, an indexing mechanism, to be described, is actuated. Should for any reason a pill not fall within the dumping receptacle, the bar 60 is projected further therein and the indexing mechanism fails to be actuated. The mechanism for accomplishing this will now be described. Adjacent the frame member 22 a spring pawl 80 is pivoted at 81 to each bar 60, this construction being shown best in Figure 10. This pawl 80 comprises a casing having slidable therein a block 82 which is normally held projected upwardly by means of a spring 83 positioned therebelow within a socket in the pawl 80 and reacting against the base of this socket. The block 82 is held from detachment from the pawl 80 by means of a screw 84 projecting through one face of the pawl and engaging in a slot 85 extending a portion only of the length of the block 82. This pawl acts against ratchet teeth formed in the edge of an indexing wheel 88 journaled on a shaft 89 extending between the frame portions 7. Each wheel 88 has integral therewith a snail cam 90, the cam and wheel being prevented from endwise movement on shaft 89 by means of a pair of side plates 91 slotted at their upper end to receive the shaft 89 and extending upwardly from the base plate 8. In order to force the block 82 into engagement with the peripheral teeth on the wheel 88, a trigger finger 95 is fixed at one end to the pawl 80 and positioned beneath this trigger finger is a leaf spring 96 engaging at its free end on the upper surface of the frame portion 8 and normally holding the free end of the trigger finger toward the lower face of the bar 60. Cooperating with the end of this trigger finger is the forward end of the bar 62, the lower portion of which end is beveled, as shown at 97. With this construction, when the bar 62 is slid forwardly by the cam 72 to project the feeler bar 60 into the dumping receptacle, if this feeler bar contacts a pill therein, it is stopped thereby, whereupon further motion of the bar 62 brings the portion 97 into contact with the trigger finger, which thereupon rocks the pawl 80 about its pivot and brings the block 82 into engagement with the ratchet teeth. Further motion of the bar 62 then acts to rock the pawl to impart a turning movement to the wheel 88. Should the bar 60 not find a pill within the receptacle, its motion is not stopped, but it continues to be projected within the receptacle and the end of the bar 62 fails to contact with the trigger finger 95 so that the pawl 80 is not actuated and the wheel 88 is not turned. In order to limit the backward movement of the pawl 80, a pin 98 is passed therethrough between the trigger finger and the bar 60 and furnishes a stop engaging this bar. The position of the parts when a pill is properly in the receptacle as the feeler rod is actuated is shown in Figure 5 and when no pill has been found, the position of the parts is as indicated in Figure 6. In order to prevent the wheel 88 from under or over-throw due to inequality in the sizes of the pills, means for resiliently centering and locking it between actuations by the pawl 80 are provided, this means comprising a pin 92 projected through an opening in one of the members 91 by means of a leaf spring 93, this pin having a pointed end engaging in a series of radial teeth 94 formed on the side face of the wheel 88.

Figures 16, 17:
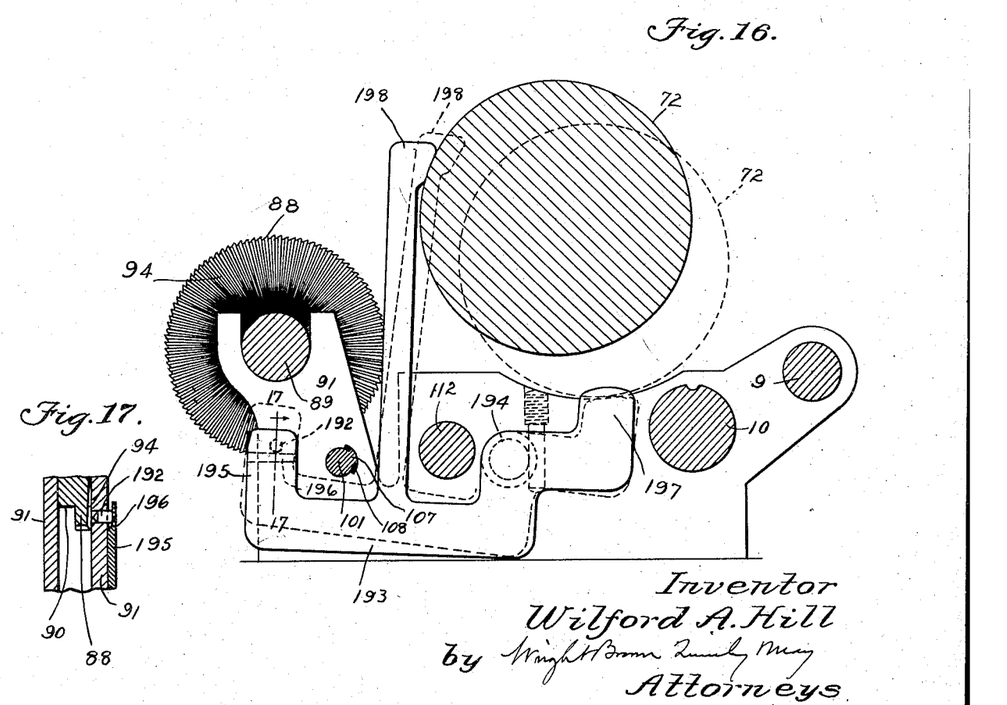
Figure 16 is a detailed view of a modified locking mechanism for an indexing mechanism.
Figure 17 is a section on line 17—17 of Figure 16.

In Figures 16 and 17, is shown a modified construction for preventing overthrow of the indexing wheel 88, this construction providing a positive lock which is released for the feeding motions. For this purpose a pin 192 is positioned in the opening in the member 91 in engaging relation to the face teeth 94 on the wheel 88, this pin being projected positively at certain times by means of a lever 193 fulcrumed at 194 on the member 91 and having an upwardly extending arm 195 beveled off on its inner face at 196 where it engages the outer end of the pin 192. By rocking this lever to bring the arm 195 upwardly, it is evident that the pin 196 will be pushed inwardly into positive engagement within the teeth 94. This positive motion of the lever 193 to locking position is effected by means of an arm 197 projecting upwardly therefrom and into the path of motion of the cylindrical cam 72, and the portion 195 is rocked downwardly to release the pin by means of an arm 198 upstanding from the lever 193 and also actuated by the same cylindrical cam 72.

It is necessary that the filling of each bottle be stopped after the required number of pills has been fed thereto, and for this purpose the snail cam 90, above mentioned, has been provided. This cam is acted on by an upwardly extending arm 100 pivoted on a shaft 101 extending transversely of the machine, this arm 100 being held in engagement with the periphery of the snail cam by means of a torsion coil spring 102 having one arm engaging the arm 100 at 103 and the other arm fixed to a transverse pin 104. The arm 107 has fixed thereto on the opposite side of the shaft 101 a pawl 105, this pawl being adapted to engage at times in a notch 106 cut in the top face of the bar 62 adjacent the pin 66. The shaft 101 is allowed a limited rocking motion relative to the arm 100 by means of an arcuate portion 107 thereon riding in an arcuate slot 108 in arm 100 of somewhat greater length than the member 107. As soon as the wheel 88 has been stepped around by the pawl 80 to such an extent as to present the sudden drop of the snail cam to the member 100, the spring 102 then throws the pawl 105 downwardly and on the next actuation of the bar 62 this pawl catches in the notch 106 and prevents retraction of the bar 62, as shown in Figure 6. The feeler bar 60 is thus held projected within the receptacle so that no space is provided therein for the reception of a pill. Subsequent actuation of the separator plate and the dumping receptacle therefore fails to present a pill to the bottle.

It is desirable that all the bottles in a row shall be filled with the required number of pills before they are removed from the filling mechanism and a row of empty bottles substituted therefor. In order to provide for this action and for feeding the series of rows as the bottles become correctly filled, the following mechanism is provided. Each member 100 has projecting from the rear face thereof a lug 110, this lug being normally positioned within a slot 111 formed in the forward face of a shaft 112 extending transversely of the machine. When the arm 100 is in the position shown in Figure 5, in which position the indexing mechanism is in operation, the lug 110 projects within the slot 111, but when the indexing mechanism has been rendered inoperative by the completion of the filling operation, the lug 110 moves out of the slot 111 as shown in Figure 6. The shaft 112 is mounted to slide axially in the machine, and it is evident that as long as any one of the lugs 110 is positioned in its slot 111 axial movement is prevented, but when all of the lugs 110 are out of their slots, axial motion of the shaft is allowed.

Figure 9:
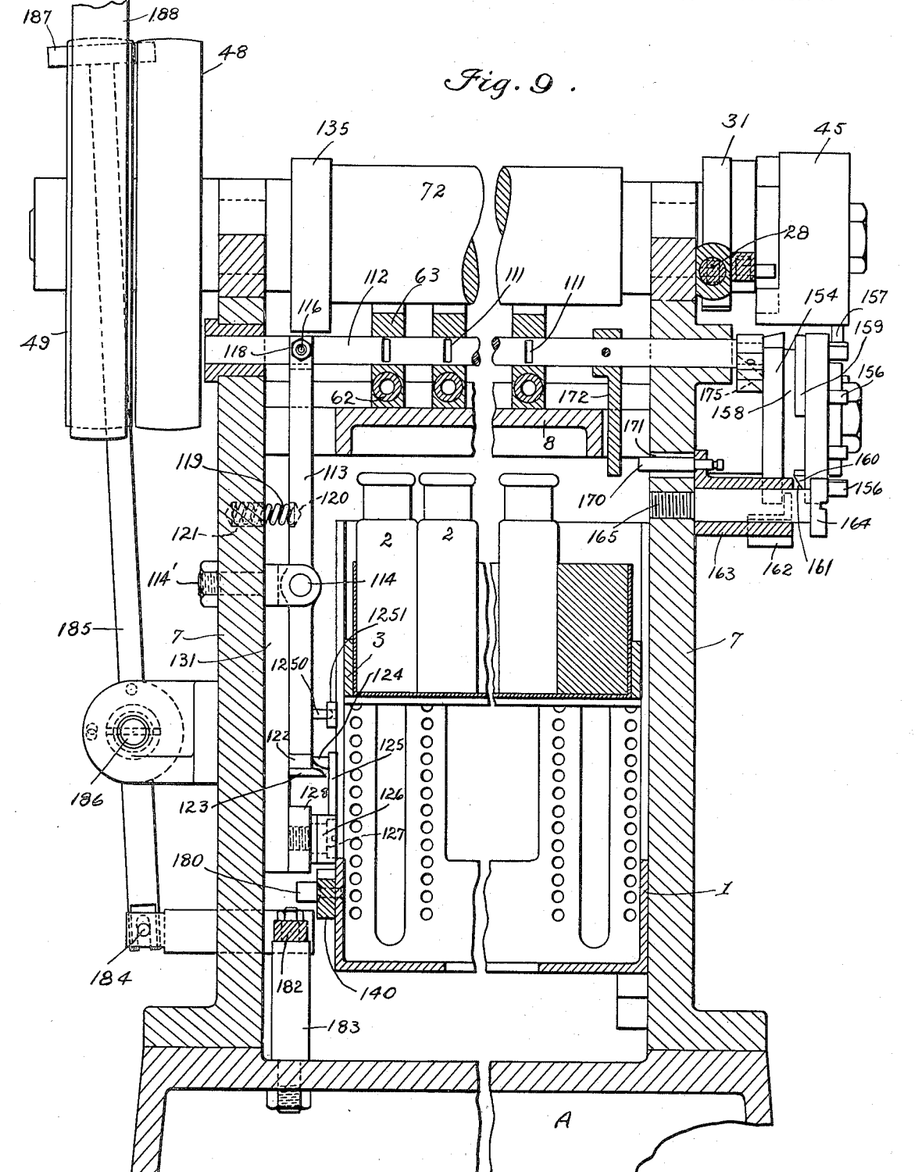
Figure 9 is a section on line 9—9 of Figure 8.
Figure 15:
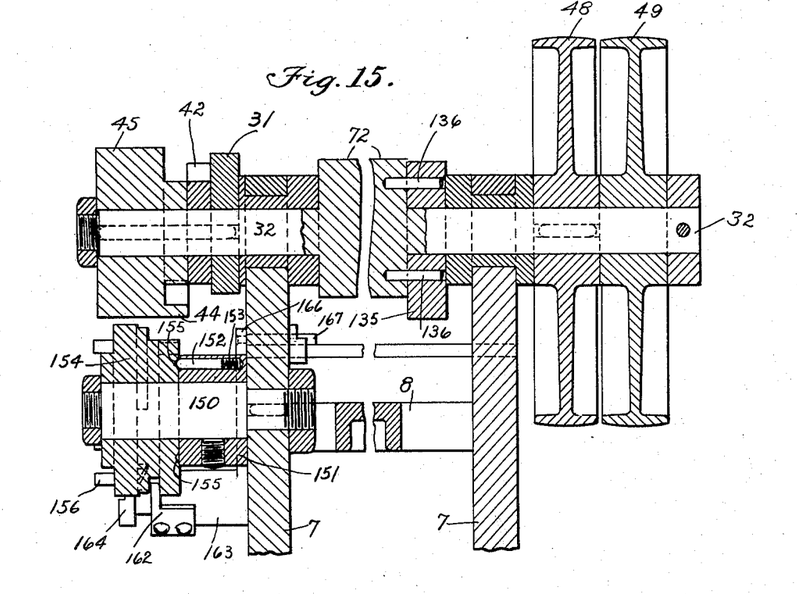
Figure 15 is a section on line 15—15 of Figure 1.

In order to move this shaft axially as soon as permitted, a lever 113 (see Figure 9) fulcrumed at 114 to a bolt 114' passing through one of the side frames 7 is forked at its upper end, as shown at 115 (Figures 7, 8 and 9), and through the forked portions 115 are passed pivot pins 116 engaging in a hole 117 transversely of the shaft 112. The pins 116 are threaded and check nuts 118 at their outer ends prevent them from becoming detached. The lever 113 is acted on by a spring 119 seated in a socket 120 therein at one end and in a socket 121 in the adjacent frame member 7 at the other, this spring serving to project the shaft 112 axially as soon as permitted by the release from the notches 111 of all the lugs 110 and the proper positioning of a cam to be later described. The lower end of lever 113 terminates in a horizontal flanged portion 122 on the flange 123 of which may ride a pin 124 fixed to an arm 125 formed integral with a pawl 126. As shown in Figure 9, the lower face of the pin 124 is beveled off and the upper face of the flange 123 is also beveled off so that on relative lateral movement of these members, the flange 123 may hook under the pin 124 and raise the same upwardly. The pawl 126 is loosely fulcrumed on the pin 127 which is carried by the forward end of a slotted link 128. This link is slidable over a pin 129 extending through the slot 130 thereof and is actuated by means of a lever 131 pivoted thereto at 132. This lever is fulcrumed at 133, a plurality of holes for this fulcrum pin being provided to allow adjusting of the extent of feed to conform to various widths of bottles, and carries at its upper end a cam roll 134 in cooperative relation to an edge cam 135 also fixed to the main shaft 32 and pinned by pins 136, as shown in Figure 15, to the end of the cylindrical cam 72. The cam roll 134 is normally held in engagement with the cam 135 by means of a spring 137 hooked over a pin 138 on lever 131 at one end, and at its other end engaging a pin 139 fixed to one of the side frames 7. The pawl 126 is positioned above a socket bar 140, which, as shown more clearly in Figure 9. is fixed to the table 1. Before the shaft 112 is released for axial movement, the flange 123 is beneath the pin 124 of the pawl 125 and holds the pawl out of engagement with the bar 140, which oscillates idly at each actuation of the lever 131, the pin 124 riding on the upper surface of the flange 123. As soon as the shaft 112 has been released, as above described, and is projected laterally by means of the spring 119, the flange 123 is removed laterally from beneath the pin 124. This action allows the pawl 125 to descend into engagement with the ratchet bar 140 so that on the next actuation of the lever 131 feed motion is imparted to the table 1 so that a succeeding row of bottles is positioned in operative relation to the dumping receptacles. In order to prevent movement of the table when the filling operation is taking place, a locking mechanism therefor is preferably provided. This may consist of a locking pin 1250 carried by lever 113 which is normally held in engagement with one of a series of perforations in a bar 1251 (see Figures 3, 8 and 9) fixed to the table above the ratchet bar 140. When the lever 113 is swung to permit feeding actuation of the pawl 125, as above described, pin 1250 is moved out of engagement with the bar 1251 to unlock the table.

When this table feed has taken place, it is necessary to return the filling mechanism and the indexing mechanism to their operative positions in order to fill the bottles of the row now presented. This action is effected by the following mechanism. Positioned below the shaft 32 is a stud shaft 150 projecting outwardly from one side frame member 7 (see Figures 7 and 15). Fixed to this shaft outwardly of the frame member 7 is a collar 151 having one or more perforations therein, parallel with the axis of the shaft 150, each for the reception of a spring pin, as shown at 152, normally projected outwardly by means of a coil spring 153 seated behind it. These pins project outwardly into engagement with the inner face of a cam member 154, depressions 155 being formed on its inner face to receive the ends of the pins 152 to yieldingly hold the cam in any of a plurality of angular positions on the shaft 150. The outer face of the cam 154 carries a circular series of pins 156, as shown more particularly in Figures 1, 4 and 15, which may be contacted by a pin 157 extending outwardly from the disc 45. By the rotation of this disc it is evident that the cam 154 is rotated with a step by step movement by means of the engagement of the pins 156 and 157. The cam 154 has a peripheral groove 158. This groove is partially filled at its outer side by cam portions, one of which at 159 rises up from the base of the groove and extends a substantial distance therein and another of which, 160, considerably shorter than cam 159 has a beveled inner face 161 (see Figure 9). Cooperating with these cam portions 159 and 160 is an arm 162 fixed to a sleeve 163 (see Figures 4 and 9), slidable axially on a pin 164 threaded at its inner end at 165 in the frame 7, this arm normally riding in the open portion of groove 158. This sleeve 163 has also fixed thereto an upwardly extending arm 166 having a pin 167 projecting inwardly therefrom at its end, and engaging in a slot 168 in an arm 169 fixed to the end of the shaft 101, which shaft, as before described, carries the pawls for locking the feeler actuator bars 62 inoperative. The arm 166 also has fixed thereto a pin 170 which projects through an opening 171 in the frame member 7 (see Figure 9) into the path of movement of an arm 172 fixed to the shaft 112. By this means when the shaft 112 is projected laterally, the arm 172 thereon impinges on the pin 170 and slides the sleeve 163 outwardly so that the arm 162 is brought into the path of rotation of the cam portions 159 and 160. As the cam portion 159 strikes the arm 162, the sleeve 163 is rocked upwardly, thus raising the arm 168 and rocking the shaft 101 to lift the locking pawls 105 out of engagement with the feeler actuating bars 62, thus allowing the springs 73 to return the cam rolls 71 into operative relation to the cylindrical cam 72.

Figure 7:
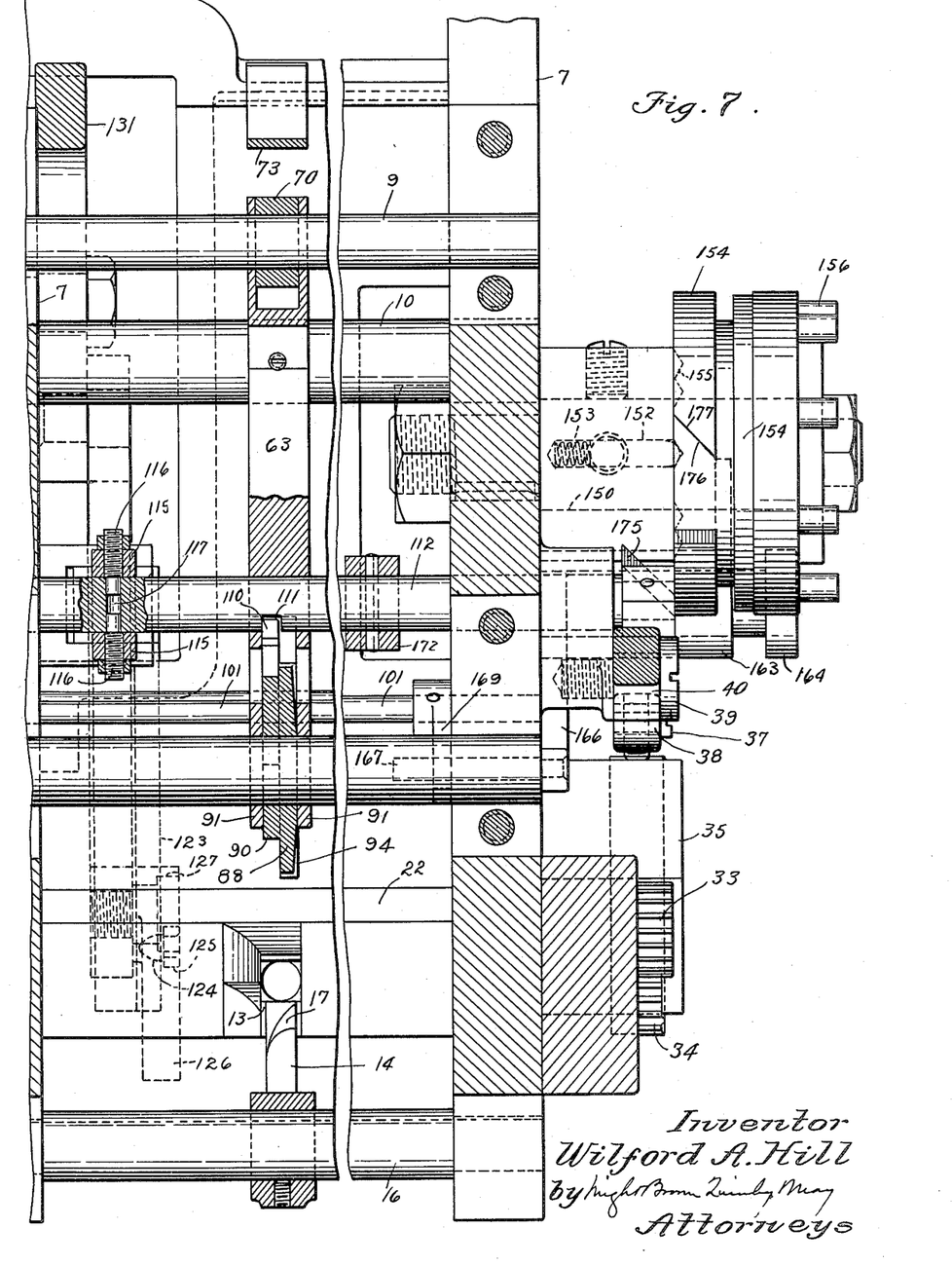
Figure 7 is a section on line 7—7 of Figure 5.
Figure 8:
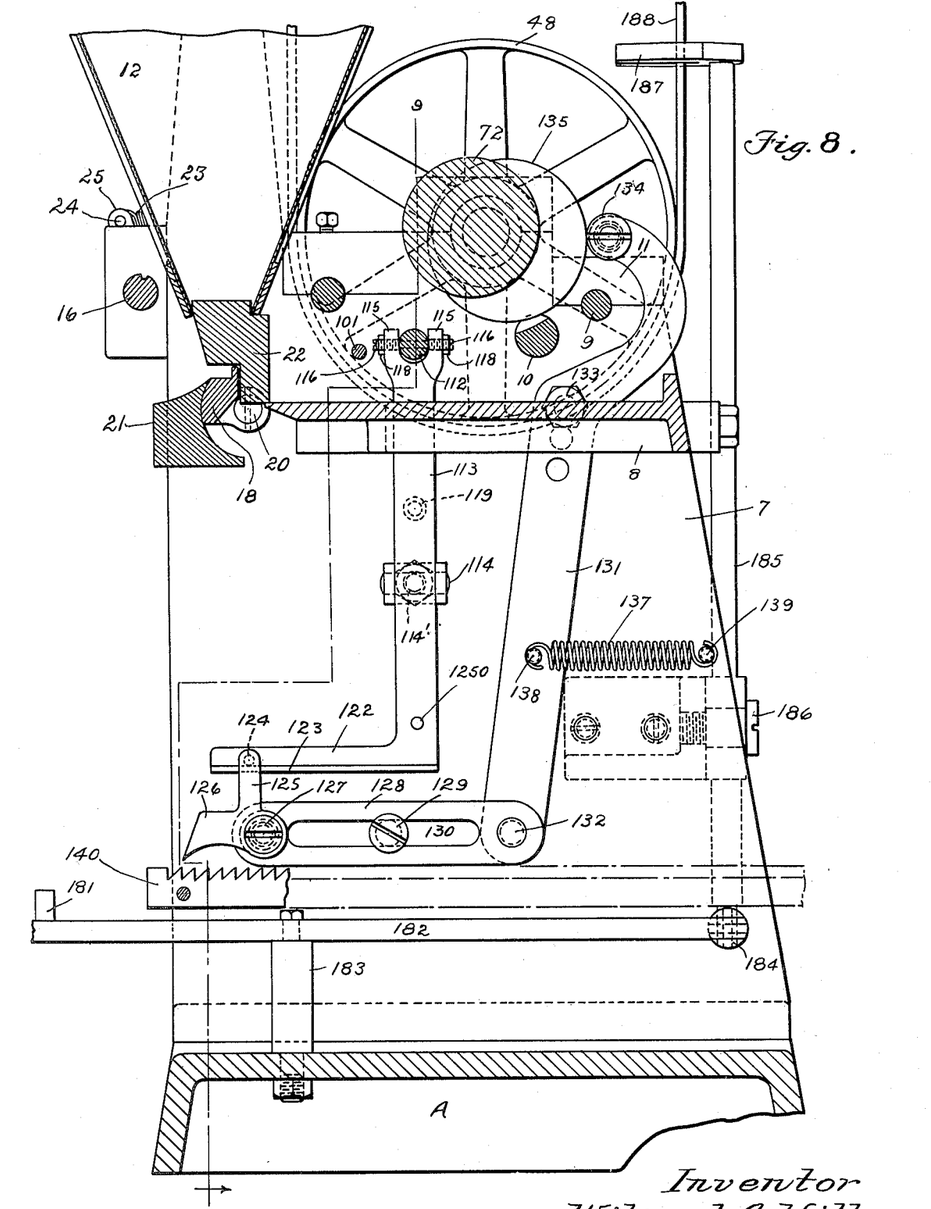
Figure 8 is a section on line 8—8 of Figure 3.

For the purpose of returning the shaft 112 axially to its former position where it may be locked by engagement with the lugs 110 in the slots 111, the outer end of this shaft has a wedge shaped portion 175, the inner face of the cam 154 being cut away, as shown at 176 in Figure 7, to allow the shaft 112 to be moved axially when this portion is presented opposite the member 175. When this cam is rotated to bring the beveled face 177 of this cut out against the beveled portion 175, the shaft 112 is wedged back in an axial direction to its former position. About the time that this takes place, the arm 162 which has been rocked to release pawls 105, is impinged by the cam portion 160, and the laterally inclined face 161 thereon wedges the arm 162 back toward the frame member 7, returning the sleeve to its former inward position with the arm 162 riding within the clear space of the slot 158. The lost motion connection between the shaft 101 and the pawls 105 allows the arm 162 to ride off the end of the cam portion 159 without returning the locking pawls into locking position. The arm 162 is normally held within the slot 158 by means of a spring 178 fixed at one end to this arm at the pin 170 and at its other end to a fixed point 179 in the frame portion 7.

Means for stopping the machine when the bottles of the last row have been filled and fed has been provided, this means consisting of a cam block 180 (see Figures 1 and 9) made fast to the support or table 1, which impinges on a pin 181 carried by an arm 182 fulcrumed at 183 to the base of the machine and pivoted at 184 to the lower end of a belt shifter lever 185 pivoted at 186 to the machine frame and carrying at its upper end shifter fingers 187 engaging the main drive belt 188, by which it may be moved from the tight to the loose pulley. The lever 182 is extended beyond the pin 181 to form a handle 189 for manual actuation of the belt shifter.

Having thus described this invention it is evident that a construction has been provided wherein a series of rows of containers are presented in sequence to filling mechanisms which are adapted to fill simultaneously all the containers of a single row; that the filling mechanism for each container is actuated until such time as the requisite number of articles has been fed thereinto, whereupon this individual mechanism becomes inoperative; and that when all the mechanisms for the row have completed their filling operations and become inoperative the row of containers is fed away from the filling mechanisms and an adjacent row moved into position to be filled, whereupon the filling mechanisms resume their operative positions and fill each container of the newly presented row. It should also be evident to those skilled in the art that many changes and modifications might be made in the machine shown without departing from the spirit or scope of this invention as defined by the appended claims.

I claim:

1. A machine of the class described comprising a support for a series of rows of containers, means to feed articles into each container of a row, and means acting after each container of said row has received a predetermined number of articles for moving said support to present a succeeding row of containers to said feeding means.

2. A machine of the class described comprising, in combination, a holder for a series of rows of containers movable to present the containers of each row serially in position to be filled, a filling mechanism for each container of a row actuable to supply a measured quantity of material to each container and then to become inoperative, and means automatically actuated when all the containers of a row have been filled for moving said holder to present a succeeding row of containers to said filling mechanisms.

3. A machine of the class described comprising, in combination, a holder for a series of rows of containers movable to present the containers of each row serially in position to be filled, a filling mechanism for each container of a row actuable to supply a measured quantity of material to each container and then to become inoperative, means automatically actuated when all the containers of a row have been filled for moving said holder to present a succeeding row of containers to said filling mechanism, and means actuable on the completion of the filling of the containers in the last row to stop the machine.

4. A machine of the class described comprising, in combination, a support for a series of rows of containers, means to feed articles into each container of a row, an independent indexing mechanism for each container of said row acting to stop the feed thereto after a predetermined number of articles have been fed, and means acting only when all the indexing mechanisms have stopped the feed for moving said support to present a succeeding row of containers to said feeding means.

5. A machine of the class described comprising, in combination, a support for a series of rows of containers, means to feed articles into each container of a row, an independent indexing mechanism for each container of said row acting to stop the feed thereto after a predetermined number of articles have been fed, means acting only when all the indexing mechanisms have stopped the feed for moving said support to present a succeeding row of containers to said feeding means, and mechanism acting after the containers in the last row of the series have been filled for stopping the machine.

6. A machine of the class described comprising, in combination, a holder for a series of rows of containers movable in succession to present the containers of each row in position to be filled, a dumping receptacle for each container of a row adapted to contain a single article and to discharge said article into its respective container, a feeler projectable into each container in contact with an article therein, an indexing mechanism actuable by each feeler in contact with said article and inoperative on failure of said feeler to impinge on an article, and means actuable when all of said indexing mechanisms have been actuated to a definite extent to move said series of rows of containers to present those of the next adjacent row in operative relation to said receptacles.

7. A machine of the class described comprising, in combination, a receptacle, a feeler projectable into said receptacle, an indexing mechanism, means for projecting and withdrawing said feeler, and means for actuating said mechanism operative when said feeler contacts an article in said receptacle and inoperative when said feeler fails to contact an article therein.

8. A machine of the class described comprising, in combination, a dumping receptacle, a series of containers movable in succession to receive articles dumped from said receptacle, a feeler projectable into said receptacle, means for projecting and withdrawing said feeler, an indexing mechanism, means for actuating said indexing mechanism when said feeler is projected operative only when said feeler contacts an article in said receptacle, and means actuable after a definite extent of indexing movement for moving said series to present an empty container in operative relation to said receptacle.

9. In a machine of the class described, in combination, a dumping receptacle, a feeler projectable into and withdrawable from said receptacle, an actuator for said feeler yieldingly connected thereto, an indexing mechanism, means operable on relative movement of said feeler and actuator for actuating said indexing mechanism, and means actuable after a definite indexing movement to prevent actuation of said feeler.

10. In a machine of the class described, in combination, a dumping receptacle, a feeler projectable into and withdrawable from said receptacle and substantially filling said receptacle when projected, an actuator for said feeler yieldingly connected thereto, an indexing mechanism, means operable on relative movement of said feeler and actuator for actuating said indexing mechanism, and means actuable after a definite indexing movement to prevent withdrawal of said feeler and to prevent the feed of articles to said receptacle.

11. A machine of the class described comprising, in combination, a dumping receptacle, means to feed an article thereto, means to dump said receptacle after each feed, a feeler projected into said receptacle between the filling and dumping thereof and arranged to impinge on an article therein, an indexing mechanism, and means controlled by said feeler for actuating said indexing mechanism constructed and arranged to be inoperative on the failure of said feeler to impinge on an article in said receptacle.

12. A distributing mechanism comprising a hopper having a passageway leading downwardly therefrom of sufficient size to hold a single row of articles carried in said hopper, and a separator plate projectable through said passageway to raise the articles therein into said hopper, said plate having a laterally inclined face to permit the passage of articles from one side into said passageway on the retraction of said plate and to prevent the passage of articles from the other side.

13. In a machine of the class described, in combination, a series of dumping receptacles, means to feed articles singly into said receptacles, means to dump said receptacles after each feed, a holder for a series of rows of containers movable to present the containers of each row in succession in operative relation to said receptacles, a feed mechanism for said holder, means for periodically actuating said mechanism, means for rendering said mechanism inoperative to feed said holder, and means acting on the filling of each receptacle of a row with a predetermined number of articles for causing said inoperative-rendering means to become ineffective.

14. In a machine of the class described, in combination, a holder for a series of rows of containers, an article-delivering mechanism positioned to deliver articles simultaneously to all the containers of a single row, means for counting articles delivered by each mechanism, a movable member, means tending to move said member, an element controlled by each counting means for locking said member from moving until such time as a predetermined number of articles have been delivered by its respective mechanism, a holder feeding mechanism, and means acting on the moving of said member for rendering said feeding mechanism operative to present a succeeding row of containers to said delivering mechanisms.

15. In a machine of the class described, in combination, a holder for a series of rows of containers, article-delivering mechanisms positioned to deliver articles simultaneously to all the containers of a single row, means for counting articles delivered by each mechanism, a movable member, means tending to move said member, an element controlled by each counting means for locking said member from moving until such time as a predetermined number of articles have been delivered by its respective mechanism, a holder feeding mechanism, means acting on the moving of said member for rendering said feeding mechanism operative to present a succeeding row of containers to said delivering mechanisms, and means for returning said member to its former position at each feed of said holder.

16. In a machine of the class described, in combination, a holder for a series of rows of containers, delivery mechanisms positioned to simultaneously fill each container of a single row, means to determine the extent to which each container shall be filled, means to feed said holder to present a succeeding row of containers in position to be filled, and means controlled by said determining means for rendering said feeding means inoperative until such time as all of the containers of the row have been filled to the desired extent.

17. In a machine of the class described, a supply hopper, means to hold a row of bottles adjacent said hopper, a receptacle positioned over each bottle, and means for automatically delivering successive charges of material from said hopper to said receptacle and discharging such charges into said bottles.

18. In a machine of the class described, a supply hopper, a plurality of dumping receptacles positioned in a stationary chamber beneath said hopper and to which said hopper feeds, a holder for positioning a series of containers beneath said receptacles, means for simultaneously feeding material from said hopper to said receptacles, means for thereafter dumping said material into said containers and means for moving said holder to present successive series of containers to said receptacles.

19. A machine of the class described, comprising in combination, a hopper, means for feeding measured quantities of material from said hopper, an indexing mechanism for counting the number of quantities fed, and means dependent for operation on the presence of material in said feeding means between successive feeding actions for actuating said mechanism.

20. A machine of the class described comprising a support for a series of rows of containers, means for feeding measured quantities of material into each container of a row, indexing mechanisms for each feeding means dependent for operation on the presence of material in each feeding means between successive feeding operations for counting the number of measured quantities fed to each container, and means controlled by said mechanism for actuating said support to present a succeeding row of containers to said feeding means, acting only when each container of the preceding series has received a predetermined number of measured quantities of material.

21. In a machine of the class described, a supply hopper, means for supporting a container, a counting mechanism, means for transferring articles from the hopper to a container so supported, and means operatively controlled by said counting mechanism to render inoperative said transfer means after a definite number of articles have been transferred from said hopper to said container.

In testimony whereof I have affixed my signature.

WILFORD A. HILL.